US012688760B2

(12) United States Patent
Yamamoto

(10) Patent No.: US 12,688,760 B2
(45) Date of Patent: Jul. 21, 2026

(54) USER TERMINAL

(71) Applicant: NTT DOCOMO, INC., Tokyo (JP)

(72) Inventor: Naoki Yamamoto, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 113 days.

(21) Appl. No.: 18/694,070

(22) PCT Filed: Sep. 28, 2022

(86) PCT No.: PCT/JP2022/036124
§ 371 (c)(1),
(2) Date: Mar. 21, 2024

(87) PCT Pub. No.: WO2023/054453
PCT Pub. Date: Apr. 6, 2023

(65) Prior Publication Data

US 2024/0386785 A1 Nov. 21, 2024

(30) Foreign Application Priority Data

Sep. 28, 2021 (JP) ................................. 2021-157540

(51) Int. Cl.
*G08B 3/10* (2006.01)

(52) U.S. Cl.
CPC .................................. *G08B 3/1066* (2013.01)

(58) Field of Classification Search
None
See application file for complete search history.

(56) References Cited

U.S. PATENT DOCUMENTS 8,781,500 B1 * 7/2014 Dekel ............... H04M 1/72457 455/412.2
9,008,629 B1 * 4/2015 Masterman ........... H04M 19/04 455/418
9,125,144 B1 * 9/2015 Orbach ................. H04M 19/04
9,635,638 B1 * 4/2017 Burlingham ............ H04W 4/18
(Continued)

FOREIGN PATENT DOCUMENTS

CA 3146872 A1 * 1/2021 ............. G06F 8/656
GB 2541641 A * 3/2017 ........... H04L 51/224
JP 2005-252971 A 9/2005

OTHER PUBLICATIONS

International Preliminary Report on Patentability and Written Opinion issued Apr. 11, 2024 in PCT/JP2022/036124, 5 pages.
(Continued)

*Primary Examiner* — Fekadeselassie Girma
(74) *Attorney, Agent, or Firm* — Oblon, McClelland, Maier & Neustadt, L.L.P.

(57) ABSTRACT

A user terminal (10) according to one embodiment includes: a notification unit (11) configured to perform a notification for the user using at least one of a sound or a vibration; and a control unit (14) configured to control operations of the notification unit (11). The control unit (14) causes the notification unit (11) to execute a dummy notification not including details of which the user is to be notified at a predetermined notification timing separately from a regular notification including details of which the user is to be notified. The notification unit (11) sets a sound level or a vibration intensity of the dummy notification to be lower than a sound level or a vibration intensity of the regular notification.

7 Claims, 4 Drawing Sheets

(56) References Cited

U.S. PATENT DOCUMENTS

| | | | | |
|---|---|---|---|---|
| 11,178,267 | B1 * | 11/2021 | Delaney | H04M 1/2474 |
| 11,969,578 | B2 * | 4/2024 | Morris | G06F 21/606 |
| 2015/0332564 | A1 * | 11/2015 | Weinberg | H04M 19/044 340/407.1 |
| 2020/0296207 | A1 * | 9/2020 | Liu | H04M 1/725 |
| 2020/0390402 | A1 * | 12/2020 | Fernando | A61B 5/746 |
| 2021/0076171 | A1 * | 3/2021 | George Philip | H04M 1/72412 |
| 2021/0210203 | A1 * | 7/2021 | Bhogal | G16H 50/70 |
| 2022/0028015 | A1 * | 1/2022 | Stockdale | G06F 9/54 |
| 2022/0138681 | A1 * | 5/2022 | Newell | G06N 20/00 705/341 |

OTHER PUBLICATIONS

International Search Report mailed on Dec. 13, 2022 in PCT/JP2022/036124 filed on Sep. 28, 2022, 2 pages.

* cited by examiner

USER TERMINAL

TECHNICAL FIELD

One aspect of the present invention relates to a user terminal.

BACKGROUND ART

Conventionally, user terminals such as a portable terminal, a smartphone, and the like giving notifications to users using sounds or vibrations are known. For example, in Patent Literature 1, a structure giving a notification to a user by vibrating a vibrator is disclosed.

CITATION LIST

Patent Literature

[Patent Literature 1] Japanese Unexamined Patent Publication No. 2005-252971

SUMMARY OF INVENTION

Technical Problem

Recently, occurrence of physical or mental health disorders according to long-time use (overuse) of user terminals has been causing problems. More specifically, in recent years, the number of persons suffering from visual display terminal (VDT) syndromes such as tired eyes or stiff shoulders has increased in accordance with long-time use of user terminals. As one reason for long-time use of a user terminal, there is a user's action tendency of "checking a screen of the user terminal due to concern about the presence/absence of a notification delivered to the user terminal." In addition, the more excessively a user is concerned about a notification of a user terminal in this way, the more likely the user tends to be to think that the user terminal has received a notification (in other words, that a sound or a vibration has been output from the user terminal) in spite of the user terminal not having actually received a notification. There are cases in which a user who has checked the screen of the user terminal in spite of no notification having actually been received as described above continues to use the user terminal. In this way, there is a problem in that a use frequency and a use time of the user terminal increase.

Thus, an object of one aspect of the present invention is to provide a user terminal capable of suppressing long-time use of a user terminal by decreasing the frequency of user's unnecessary terminal checking.

Solution to Problem

According to one aspect of the present invention, there is provided a user terminal held by a user, the user terminal including: a notification unit configured to perform a notification for the user using at least one of a sound or a vibration; and a control unit configured to control operations of the notification unit, in which the control unit causes the notification unit to execute a dummy notification not including details of which the user is to be notified at a predetermined notification timing separately from a regular notification including details of which the user is to be notified, and the notification unit sets a sound level or a vibration intensity of the dummy notification to be lower than a sound level or a vibration intensity of the regular notification.

In the user terminal according to one aspect of the present invention, a dummy notification of a sound level or a vibration intensity lower than that of a regular notification is given to the user. However, the dummy notification does not include details of which the user is to be notified. For this reason, a user who has perceived a dummy notification and checked the user terminal goes through an experience of "checking the screen of the user terminal due to perception of a sound or a vibration but finding no notification." By repeating such an experience, the user is able to differentiate a regular notification and a dummy notification and does not intentionally check the user terminal in a case in which the dummy notification is performed. In this way, as a result of the user not responding to even a dummy notification from which a sound or a vibration, which is smaller than that of a regular notification, is output, the use of the user terminal (in other words, continued use of the user terminal by a user who has misunderstood that a notification has arrived and checked the user terminal) performed by being triggered by misunderstanding such as phantom vibration syndrome is suppressed. Thus, according to the user terminal described above, long-time use of the user terminal can be suppressed by decreasing the frequency of the user's unnecessary terminal checking.

Advantageous Effects of Invention

According to one aspect of the present invention, a user terminal capable of suppressing long-time use of a user terminal by decreasing the frequency of a user's unnecessary terminal checking can be provided.

DESCRIPTION OF EMBODIMENTS

Hereinafter, one embodiment of the present invention will be described in detail with reference to the attached drawings. In description of the drawings, the same reference signs will be assigned to the same elements or elements corresponding to each other, and duplicate description will be omitted.

Figure 1:
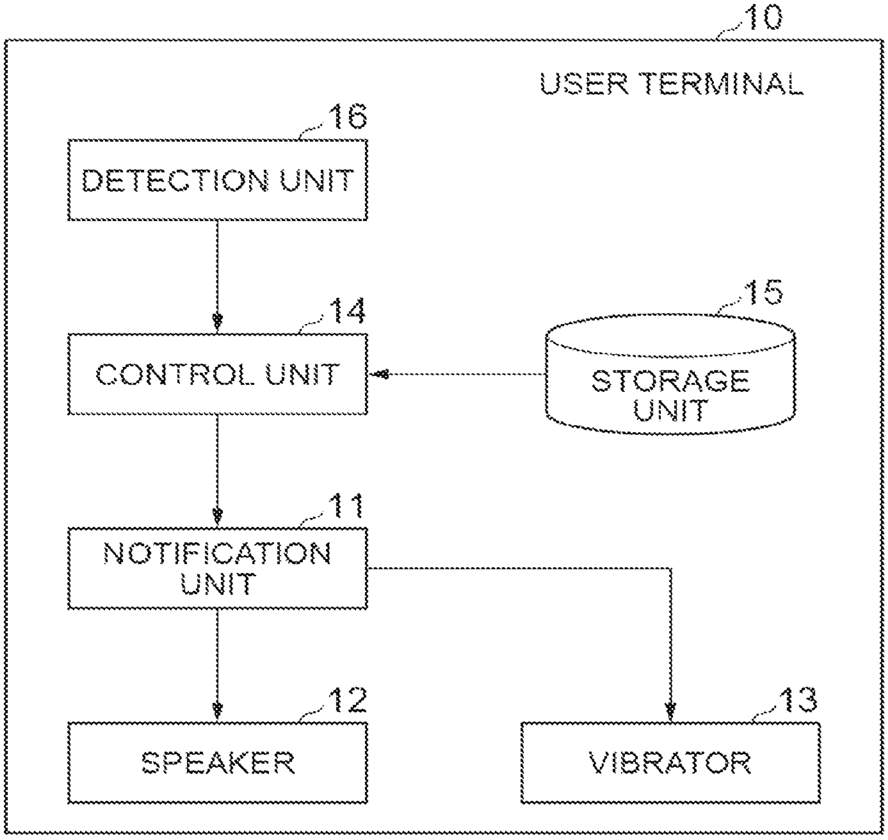
FIG. 1 is a diagram illustrating one example of a functional configuration of a user terminal according to one embodiment.

FIG. 1 is a diagram illustrating one example of a functional configuration of a user terminal 10 according to one embodiment. The user terminal 10 is a terminal device that is held by a user. Examples of the user terminal 10 include a mobile telephone, a smartphone, and a mobile terminal such as a tablet. As another example of the user terminal 10, there is a wearable terminal that is worn on a part of the body of a user such as a smartwatch.

In order to suppress a user's long-time use (overuse) of the user terminal 10, the user terminal 10 has not only a regular notification function for giving a regular notification using a sound or a vibration but also a dummy notification function for giving a dummy notification using a sound or a vibration smaller (weaker) than that of a regular notification at a predetermined notification timing. For example, in a case in which an operation mode of the user terminal 10 is set to a regular mode, a regular notification and a dummy notification are performed using only a sound or both a sound and a vibration. On the other hand, in a case in which the operation mode of the user terminal 10 is set to a manner mode, the regular notification and the dummy notification are performed using only a vibration.

A "regular notification" is a notification performed using a notification function that is usually included in the user terminal 10. The regular notification is a notification that includes details of which the user is to be notified. For example, a regular notification is a notification performed for urging a user to check or use the user terminal by using each function (application) operating on the user terminal 10. Examples of a regular notification include a mail reception notification according to a mail application, a message reception notification according to a messenger application, a notification according to a social networking service (SNS) application (for example, a notification representing a friend's posting or the like), a notification according to a game application (for example, a notification for notifying of start of an event in a game or the like), and the like. In this way, regular notifications include various notifications from various applications operating on the user terminal 10.

A "dummy notification" is a notification other than the regular notifications described above and is a notification that does not include details of which the user is to be notified. In other words, the dummy notification is notification in which only a simple notification sound or vibration is output.

Figure 2:
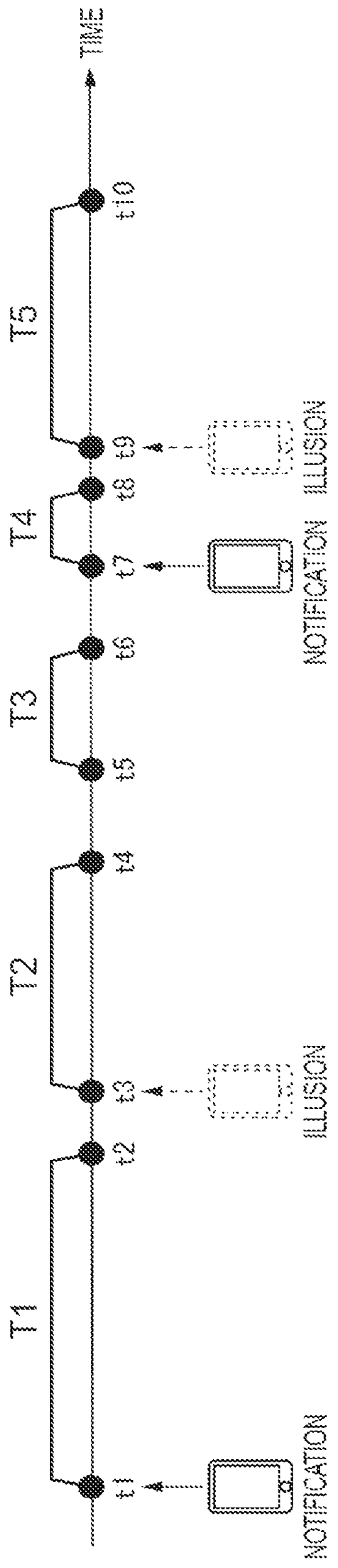
FIG. 2 is a diagram schematically illustrating an example of a user's use of a user terminal.

FIG. 2 is a diagram schematically illustrating an example of a user's use of the user terminal 10. A structure in which the user's long-time use is suppressed in accordance with the dummy notification described above will be described with reference to FIG. 2.

A period T1 from a time t1 to a time t2 is a period in which a user who is notified through a regular notification output from the user terminal 10 at the time t1 has used the user terminal 10. Similarly, a period T4 from a time t7 to a time t8 is a period in which a user who is notified through a regular notification output from the user terminal 10 at the time t7 has used the user terminal 10.

A period T2 from a time t3 to a time t4 is a period in which a user who misunderstood that a notification was given (for example, the user terminal 10 vibrated) in spite of a regular notification not actually being output has used the user terminal 10. In other words, the period T2 is a period in which, in accordance with a user misunderstanding that a regular notification was given at the time t3 and checking the screen of the user terminal 10 as a trigger, the use of the user terminal 10 is continued. Similarly, a period T5 from a time t9 to a time t10 is a period in which a user who misunderstood that a notification was given in spite of a regular notification not actually being output has used the user terminal 10. In other words, the period T5 is a period in which, in accordance with a user misunderstanding that a regular notification was given at the time t9 and checking the screen of the user terminal 10 as a trigger, the use of the user terminal 10 is continued. A phenomenon in which a user misunderstands that the user terminal 10, which is not actually vibrating, is vibrating as described above is called phantom vibration syndrome.

A period T3 from a time 15 to a time t6 is a period in which the user has spontaneously used the user terminal 10.

Among the periods T1 to T5 described above, use periods (the periods T2 and T5) of the user terminal 10 due to the user's misunderstanding can be regarded as periods that can be cut back by preventing an occurrence of the user's misunderstanding (or by making the user aware of the misunderstanding). Thus, in order to cut back the use periods (the periods T2 and T5) due to the user's misunderstanding, the user terminal 10 of this embodiment is configured to irregularly perform a dummy notification at predetermined notification timings.

As described above, the dummy notification is performed with a sound level or a vibration intensity lower than the sound level or the vibration intensity of the regular notification. By irregularly delivering such a dummy notification to a user, the user can be allowed to repeatedly go through an experience of checking the screen of the user terminal 10 due to perception of a sound or a vibration but finding no notification (in other words, there are no notification details). As a result, the user can learn a difference between a regular notification and a dummy notification. In other words, by repeating the learning described above, in a case in which a sound or a vibration smaller than that of a regular notification is output from the user terminal 10, the user is able to perceive that this sound or vibration is the dummy notification.

As a result, in a case in which a dummy notification is performed, the user does not deliberately perform checking of the terminal 10. In this way, as a result of the user not responding to even a dummy notification from which a sound or a vibration, which is smaller than that of a regular notification, is output, the use of the user terminal 10 performed by being triggered by the phenomenon of misunderstanding as described above (for example, phantom vibration syndrome) is suppressed. More specifically, even if a user has misunderstood that a sound or a vibration was output from the user terminal 10 as described above, the user judges a high possibility of misunderstanding or a dummy notification. As a result, an occurrence of the periods T2 and T5 in which the user terminal 10 is used due to the user's misunderstanding is suppressed.

Referring back to FIG. 1, each function included in the user terminal 10 for performing the dummy notification as described above will be described. The user terminal 10 includes a notification unit 11, a speaker 12, a vibrator 13, a control unit 14, a storage unit 15, and a detection unit 16.

The notification unit 11 performs a notification for a user using at least one of a sound and a vibration. In this embodiment, the notification unit 11 performs a notification using a sound by causing the speaker 12 to output a notification sound set in advance to the speaker 12. In addition, the notification unit 11 performs a notification using a vibration by causing the vibrator 13 to vibrate in a pattern set in advance. The speaker 12 is a device that has a function of outputting a sound in the user terminal 10. The vibrator 13 is a device that has a function of vibrating the user terminal 10. The vibrator 13, for example, is configured using a motor or the like.

The notification unit 11 performs a regular notification or a dummy notification on the basis of an instruction from the control unit 14. The sound level or the vibration intensity of the dummy notification is set to be lower than the sound level or the vibration intensity of the regular notification. In other words, in a case in which a notification is performed using a sound, the notification unit 11 sets the magnitude of a sound (a notification sound level) output from the speaker 12 in the dummy notification to be smaller than the magnitude of a sound output from the speaker 12 in the regular notification. In addition, in a case in which a notification using a vibration is performed, the notification unit 11 sets the vibration intensity of the vibrator 13 in the dummy notification to be smaller (weaker) than the vibration intensity of the vibrator 13 in the regular notification.

The notification sound level and the vibration intensity of the regular notification, for example, can be arbitrarily set in accordance with a user's operation of the user terminal 10. The notification sound level and the vibration intensity of the dummy notification are set to be lower than the notification sound level and the vibration intensity of the regular notification. Similar to the regular notification, the notification sound level and the vibration intensity of the dummy notification may be arbitrarily set by a user or may be set on the system (the user terminal 10) side. For example, the notification sound level and the vibration intensity of the dummy notification may be set using a ratio (a value smaller than 1) with respect to the magnitudes of the notification sound level and the vibration intensity of the regular notification by using the magnitudes of the notification sound level and the vibration intensity of the regular notification as references. As one example, the notification sound level and the vibration intensity of the dummy notification can be set to be about 30% to 50% of the magnitudes of the notification sound level and the vibration intensity of the regular notification.

The control unit 14 controls operations of the notification unit 11. More specifically, the control unit 14 causes the notification unit 11 to execute a dummy notification at a predetermined notification timing. More specifically, the control unit 14 performs control of the notification unit 11 to perform a regular notification in a case in which an instruction of the regular notification has been received from a predetermined application operating on the user terminal 10 and performs control of the notification unit 11 to execute a dummy notification at a predetermined notification timing separately from the regular notification.

The storage unit 15 is a database storing a use log and a result log to be described below and the like. The use log and the result log stored in the storage unit 15 are referred to by the control unit 14.

The detection unit 16 detects a state of the user terminal 10. The detection unit 16, for example, detects whether or not the user terminal 10 is being used on the basis of whether or not the screen display of the user terminal 10 is off. In addition, the detection unit 16, for example, may estimate a position (a place), a posture, an operation (for example, shaking or the like), and the like of the user terminal 10 on the basis of sensor information (detection values) acquired using various sensors such as a position sensor (for example, a GPS sensor or the like), an acceleration sensor, a gyro sensor (an angular velocity sensor), and the like included in the user terminal 10 and detect the state of the user terminal 10 on the basis of the position, the posture, the operation, and the like of the user terminal 10 that have been estimated. Examples of the state of the user terminal 10 detected in this way, for example, include an environment in which the user terminal 10 (that is, a user holding the user terminal 10) is present (for example, a house, a company, a school, outdoors, or the like), a state of the user terminal 10 itself (for example, a state of being approximately horizontally placed on a desk or the like, a state of being inserted into a pocket of user's clothes, or the like), and the like. In addition, detection of the state of the user terminal 10 based on such sensor information can be executed using a known state estimation algorithm. Examples of such a state estimation algorithm include an API used for detecting a state of a user (for example, a walking state, a state of riding a means of transportation, a state of being stopped, or the like) provided by Google Corporation, a position estimation technique of a smartphone (the user terminal 10) using deep learning described in the following Reference Literature 1), and the like.

(Reference Literature 1: Tatsuhito Hasegawa, Makoto Koshino, Detection of Smartphone Wearing Position in Waling Using Deep Learning, Information Processing Society of Japan Journal, Vol. 57, No. 10, 2186-2196 (October 2016)).

Hereinafter, several examples of notification timings of the dummy notification set by the control unit 14 will be described.

(First Example of Notification Timing)

The notification timing may be a time (for example, hour and minutes) set in advance. For example, for every day, notification timings corresponding to a number set in advance may be arbitrarily (for example, randomly) set. According to the first example, the process for setting the notification timings can be simplified, and the amount of calculation (a processing load) relating to the setting of the notification timings can be reduced.

(Second Example of Notification Timing)

The notification timing may be a time point at which a period set in advance (for example, 10 minutes or the like) has elapsed from a time point at which user's use of the user terminal 10 was ended. Here, "the time point at which the use of the user terminal was ended" represents a time point at which user's continuous use of one time of the user terminal 10 was ended. "Continuous use of one time", similar to the periods T1 to T5 illustrated in FIG. 2, represents use corresponding to one period in which the user continues to use the user terminal 10 continuously. For example, "continuous use of one time" may be a period after use of the user terminal 10 is started in accordance with the screen of the user terminal 10 becoming on by pressing a power button or the like of the user terminal 10 up to a time point at which a non-operation time for the user terminal 10 has continued for a time set in advance or more (for example, a time point at which the screen display becomes off). In addition, a period (hereinafter, referred to as a "specific period") set in advance from a time point at which the use of the user terminal 10 ends, for example, may be arbitrarily (for example, randomly) set on the system (the user terminal 10) side. According to the second example, similar to the first example, a process for setting a notification timing can be simplified.

(Third Example of Notification Timing)

The specific period of this second example may be set to be changeable. For example, the specific period may be set on the basis of a user's tendency. For example, the control unit 14 may set the specific period described above on the basis of the use log representing a period in which the user used the user terminal 10 in the past. The use log, for example, is information in which periods in which the user terminal 10 is used in the past like the periods T1 to T5 illustrated in FIG. 2 are recorded. In this embodiment, as one example, the use log is accumulated in the storage unit 15, and, by accessing the storage unit 15, the control unit 14 can refer to the use log. For example, the control unit 14 may calculate a statistical value (for example, an average value, a median value, a maximum frequency, or the like) between a period $T_n$ and a period $T_{n+1}$ that are adjacent to each other (in other words, a difference between a start time of the period $T_{n+1}$ and an end time of the period $T_n$) and set this statistical value as the period described above.

According to the third example, at a timing at which there is a high possibility of starting the use of the user terminal 10 again after the user ends the use of one time of the user terminal 10, the dummy notification can be timely performed. Such a timing includes timings, like start time points of the periods T2 and T5 illustrated in FIG. 2, at which there is a high possibility of starting the use of the user terminal 10 due to misunderstanding of the user. By performing a weak dummy notification at such a timing and allowing the user to recognize that "this is a dummy notification, and the user terminal does not need to be checked", start of the use of the user terminal 10 due to misunderstanding of the user can be effectively suppressed.

(Fourth Example of Notification Timing)

The control unit 14 may estimate a time frame (for example, a period delimited in units of 30 minutes) having a high possibility of the user starting the use of the user terminal 10 on the basis of the use log described above and determine a notification timing on the basis of the estimated time frame. For example, the control unit 14 may specify a time frame having a high frequency of the user starting the use of the user terminal 10 on the basis of the use log up to the previous day and set a notification timing such that it is included in the specific time frame. According to the fourth example, effects similar to those of the third example described above can be acquired.

(Fifth Example of Notification Timing)

The control unit 14 may cause the notification unit 11 to execute a dummy notification during a period in which the user terminal 10 is in a state (hereinafter, referred to as a "specific state") in which it is set in advance as a target for which a dummy notification is performed on the basis of a result of detection by the detection unit 16. In other words, the control unit 14 may set a notification timing such that it is included in a period in which the user terminal 10 is in the specific state. The specific state may be set in advance on the system (the user terminal 10) side or may be set arbitrarily by the user. Preferably, a state in which the user can easily misunderstand that a notification has been executed and easily aware of a dummy notification is set as the specific state. For example, a state in which the user terminal 10 is placed approximately horizontally on a table or the like, a state in which the user terminal 10 is inserted into a pocket of user's clothes, and the like may be set as specific states. According to the fifth example, from a point of view of suppressing the use of the user terminal 10 due to misunderstanding of the user, a notification timing can be set in an effective period (that is, a period in which the user terminal 10 is in the specific state).

In addition, the control unit 14 may check the result log of each dummy notification and control a behavior of the dummy notification using the notification unit 11 on the basis of result logs relating to a plurality of latest dummy notifications. The result log is information representing whether or not the user has started the use of the user terminal 10 using a dummy notification as a trigger when the dummy notification is executed by the notification unit 11. In addition, the number of dummy notifications of which result logs are targets to be referred to may be set in advance on the system (the user terminal 10) side or may be arbitrarily set by the user.

For example, for a plurality of latest dummy notifications, in a case in which a ratio with which the user starts the use of the user terminal 10 using the dummy notification as a trigger is a first threshold (for example, 10%) or less, the control unit 14 may stop the function of the dummy notification using the notification unit 11. The first threshold may be set in advance on the system (the user terminal 10) side or may be arbitrarily set by the user. The ratio with which the user starts the use of the user terminal 10 using the dummy notification as a trigger being a predetermined value or less is considered to represent that the user has learned a difference between a regular notification and a dummy notification to some degrees and is able to perceive a sound or a vibration weaker than that of the regular notification as a dummy notification with accuracy of a predetermined degree or more. After the learning has been almost completed in this way, there is a possibility that a dummy notification becomes only annoying to the user. In such a case, by stopping the function of the dummy notification as described above, the user's annoying is resolved, and the degree of convenience of the user can be improved.

In addition, for a plurality of latest dummy notifications, in a case in which the ratio with which the user starts the use of the user terminal 10 using the dummy notification as a trigger is a second threshold (for example, 70%) or more, the control unit 14 may decrease the magnitude of the sound level or the vibration intensity of the dummy notification to be smaller than that magnitude up to now. The second threshold may be set in advance on the system (the user terminal 10) side or may be arbitrarily set by the user. The second threshold is set to a value larger than the first threshold described above. The ratio with which the user starts the use of the user terminal 10 using the dummy notification as a trigger being a predetermined value or more is considered to represent a situation in which it is difficult for the user to differentiate a regular notification and a dummy notification (that is, a situation in which the user is unable to recognize a difference between the sound level or the vibration intensity of the dummy notification and the sound level or the vibration intensity of the regular notification). In this way, in a situation in which the user is unable to nearly recognize a difference between a regular notification and a dummy notification, it is difficult to acquire the effects described above (that is, suppression of the use of the user terminal 10 due to misunderstanding of the user) using the dummy notification. Thus, in such a case, as described above, by automatically decreasing the sound level or the vibration intensity of the dummy notification and enlarging a difference between the sound level or the vibration intensity of the regular notification and the sound level or the vibration intensity of the dummy notification, the user can be allowed to appropriately differentiate the regular notification and the dummy notification. As a result, the effects described above can be appropriately acquired using the dummy notification. In addition, by automatically adjusting the magnitude of the sound level or the vibration intensity of the dummy notification in this way, the user does not need to manually adjust the magnitude of the sound level or the vibration intensity of the dummy notification, and thus the effort of the user can be reduced.

Figure 3:
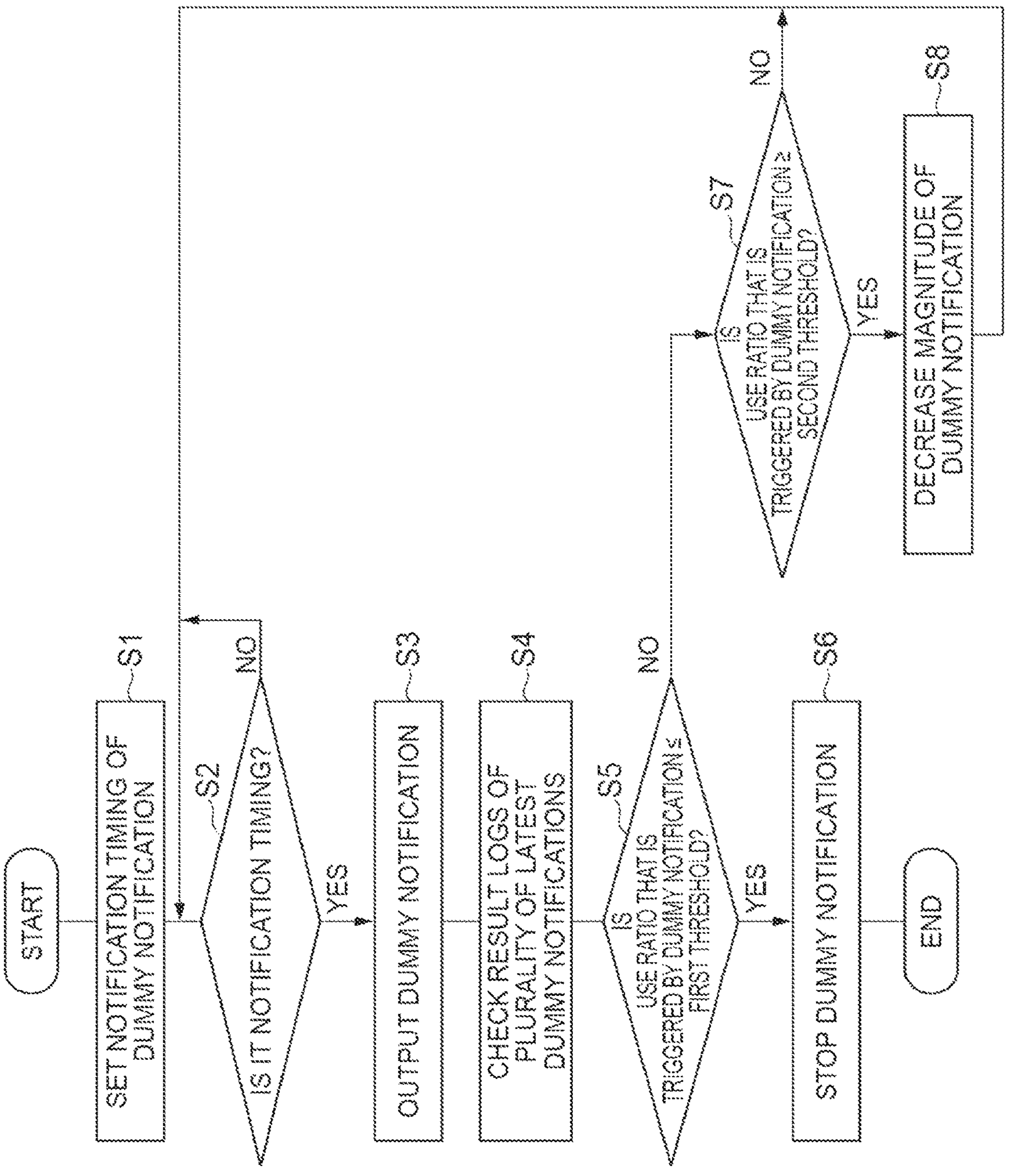
FIG. 3 is a flowchart illustrating one example of operations of the user terminal.

Next, one example of the operations of the user terminal 10 (including an information processing method according to an embodiment) will be described with reference to FIG. 3.

In Step S1, the control unit 14 sets a notification timing of a dummy notification. The control unit 14 sets the notification timing (including conditions of the notification timing) on the basis of any one or a plurality of the first example to the fifth example of the notification timing described above.

In Step S2, the control unit 14 determines whether or not the current time point is the notification timing set in Step S1. In a case in which the current time point is not the notification timing (Step S2: No), the control unit 14 performs the determination of Step S2 again after a predetermined time from the previous determination time point. On the other hand, in a case in which the current time point is the notification timing (Step S2: Yes), the control unit 14 causes the notification unit 11 to execute a dummy notification (Step S3).

In Step S3, the notification unit 11 outputs a dummy notification of a sound level or a vibration intensity lower than the sound level or the vibration intensity of a regular notification through the speaker 12 or the vibrator 13.

Processes of Steps S4 to S8 are feedback processes based on the result log representing user's reactions to the dummy notification. In addition, such feedback processes (Steps S4 to S8) may be omitted.

In Step S4, by accessing the storage unit 15, the control unit 14 checks result logs of a plurality of latest dummy notifications.

In Step S5, the control unit 14 determines whether or not a ratio with which the user starts use of the user terminal 10 using a dummy notification as a trigger is the first threshold (for example, 10%) or less. In a case in which the ratio described above is the first threshold or less (Step S5: Yes), the control unit 14 stops the function of a dummy notification using the notification unit 11 (Step S6). On the other hand, in a case in which the ratio described above is not the first threshold or less (Step S5: No), the control unit 14 performs the determination process of Step S7.

In Step S7, the control unit 14 determines whether or not the ratio described above is the second threshold (for example, 70%) or more. In a case in which the ratio described above is the second threshold or more (Step S7: Yes), the control unit 14 decreases the magnitude of the sound level or the vibration intensity of the dummy notification to be smaller than the magnitude up to now (Step S8) and continues to perform the determination process of Step S2. On the other hand, in a case in which the ratio described above is not the second threshold or more (Step S7: No), the control unit 14 continues to perform the determination process of Step S2 without changing the behavior of the dummy notification.

In the user terminal 10 described above, a dummy notification of a sound level or a vibration intensity lower than that of a regular notification is given to the user. However, the dummy notification does not include details of which the user is to be notified. For this reason, a user who perceived a dummy notification and checked the user terminal 10 goes through an experience of "although the screen of the user terminal has been checked due to perception of a sound or a vibration, no notification has not been arrived". By repeating such an experience, the user is able to differentiate a regular notification and a dummy notification and does not intentionally check the user terminal 10 in a case in which the dummy notification is performed. In this way, as a result of the user not responding to even a dummy notification from which a sound or a vibration, which is smaller than that of a regular notification, is output, the use of the user terminal 10 (in other words, a user who has misunderstood that a notification was arrived and checked the user terminal 10 continues to use the user terminal 10) performed by being triggered by misunderstanding such as the Phantom vibration syndrome is suppressed. Thus, according to the user terminal 10, by decreasing the frequency of user's unnecessary terminal checking, long-time use of the user terminal 10 can be suppressed.

In addition, as a method of suppressing the use of the user terminal 10 by being triggered by a notification, a method in which the notification function of the user terminal 10 also including a regular notification is set to off may be considered. However, in a regular notification, there is a possibility that notification details having high emergency, notification details that are useful for the user, and the like are included. Thus, when the notification function of the user terminal 10 is simply set to off, there is a problem in that details of which a user is originally to be notified cannot be notified. According to the user terminal 10, without setting the notification function of a regular notification to off, by adding a dummy notification, the phenomenon of user's misunderstanding can be suppressed, and thus long-time use of the user terminal 10 can be effectively suppressed while the problem as described above is avoided.

In addition, according to the user terminal 10, a direct method of displaying a message for user's stopping of the use of the user terminal 10 (for example, text information such as "the use time has exceeded xx minutes, and thus let's take a rest!) on the screen of the user terminal 10 is not taken, and thus long-time use of the user terminal 10 can be suppressed without giving stress to the user. In other words, according to the user terminal 10, use chances of the user terminal 10 due to user's misunderstanding (for example, the periods T2 and T5 illustrated in FIG. 2) can be decreased without allowing them to be recognized by the user. For this reason, without forcing a user not to use the user terminal 10, long-time use of the user terminal 10 can be suppressed.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 4:
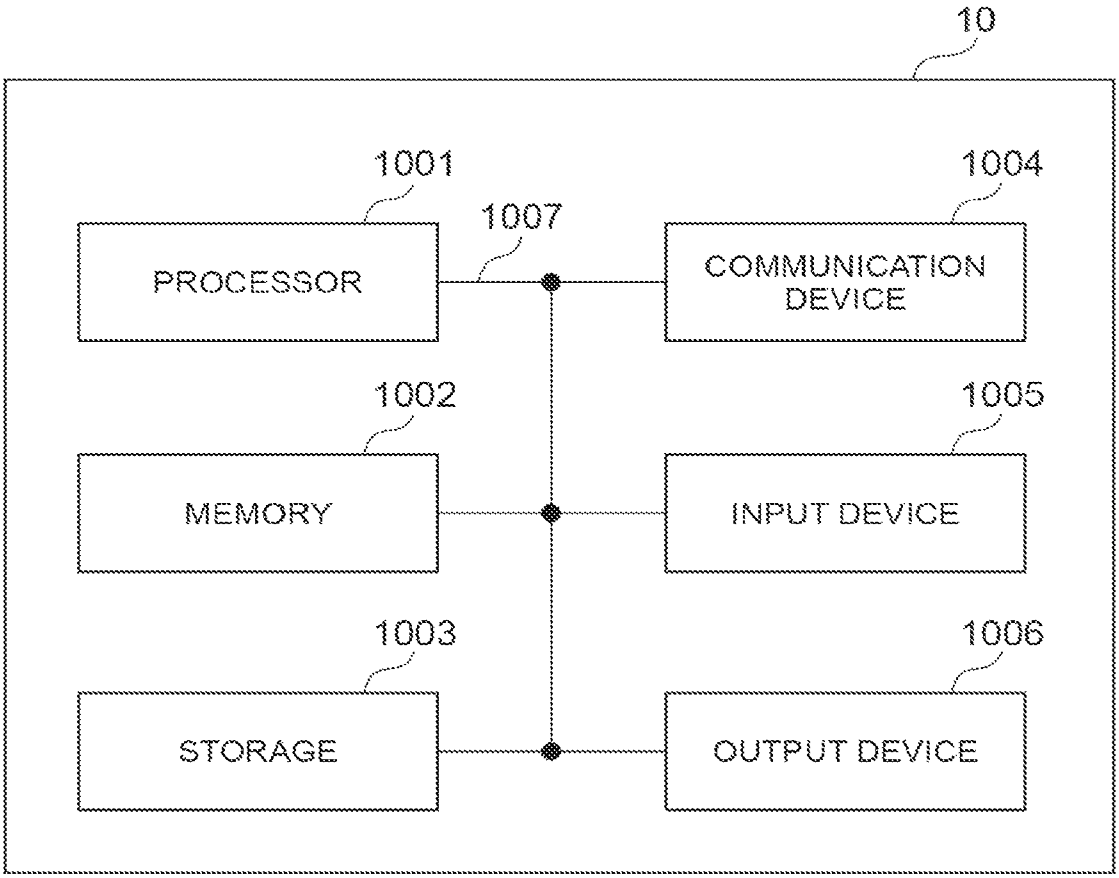
FIG. 4 is a diagram illustrating one example of a hardware configuration of the user terminal.

For example, the user terminal 10 according to an embodiment of the present invention may function as a computer that performs information processing method of the present disclosure. FIG. 4 is a diagram illustrating an example of a hardware configuration of the user terminal 10 according to the embodiment of the present disclosure. The user terminal 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the user terminal 10 may include one or a plurality of devices illustrated in FIG. 4, or may be configured without including some of the devices.

Each function in the user terminal 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, each functional unit (e.g., the control unit 14) of the user terminal 10 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the information processing method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the user terminal 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on (on the basis of)" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as "a", "an", and "the" in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST

10 User terminal
11 Notification unit
14 Control unit
16 Detection unit

The invention claimed is:

1. A user terminal held by a user, the user terminal comprising:
- processing circuitry configured to
  - perform a notification for the user using at least one of a sound or a vibration;
  - control operations to execute a dummy notification not including details of which the user is to be notified at a predetermined notification timing separately from a regular notification including details of which the user is to be notified; and
  - set a sound level or a vibration intensity of the dummy notification to be lower than a sound level or a vibration intensity of the regular notification,
- wherein the regular notification is a notification configured to cause a user to check or use the user terminal and is a notification from an actual application, from a plurality of applications, operating on the user terminal; and
- the dummy notification is a notification in which only a notification sound or vibration is output and is not from any of the plurality of applications operating on the user terminal,
- wherein the notification timing includes a time point at which a specific period set in advance has elapsed from a time point at which the user's use of the user terminal has ended.

2. The user terminal according to claim 1, wherein the processing circuitry sets the specific period on the basis of a use log representing a period in which the user used the user terminal in the past.

3. The user terminal according to claim 1, wherein the processing circuitry checks a result log for each dummy notification, representing whether or not the user has started use of the user terminal by being triggered by the dummy notification, and controls a behavior of the dummy notification on the basis of the result logs relating to a plurality of the latest dummy notifications.

4. The user terminal according to claim 3, wherein the processing circuitry, for the plurality of the latest dummy notifications, stops a function of the dummy notification in a case in which a ratio with which the user has started the use of the user terminal by being triggered by the dummy notifications is a first threshold or less.

5. The user terminal according to claim 3, wherein the processing circuitry, for the plurality of the latest dummy notifications, decreases a magnitude of the sound level or the vibration intensity of the dummy notification to be smaller than a magnitude used up to that point in a case in which a ratio with which the user has started the use of the user terminal by being triggered by the dummy notifications is a second threshold or more.

6. A user terminal held by a user, the user terminal comprising:
- processing circuitry configured to
  - perform a notification for the user using at least one of a sound or a vibration;
  - control operations to execute a dummy notification not including details of which the user is to be notified at a predetermined notification timing separately from a regular notification including details of which the user is to be notified; and
  - set a sound level or a vibration intensity of the dummy notification to be lower than a sound level or a vibration intensity of the regular notification,
- wherein the regular notification is a notification configured to cause a user to check or use the user terminal and is a notification from an actual application, from a plurality of applications, operating on the user terminal; and
- the dummy notification is a notification in which only a notification sound or vibration is output and is not from any of the plurality of applications operating on the user terminal,
- wherein the processing circuitry estimates a time frame in which there is a high possibility of the user starting use of the user terminal on the basis of a use log representing a period in which the user used the user terminal in the past and determines the notification timing on the basis of the estimated time frame.

7. A user terminal held by a user, the user terminal comprising:
- processing circuitry configured to perform a notification for the user using at least one of a sound or a vibration;

control operations to execute a dummy notification not including details of which the user is to be notified at a predetermined notification timing separately from a regular notification including details of which the user is to be notified; and set a sound level or a vibration intensity of the dummy notification to be lower than a sound level or a vibration intensity of the regular notification, wherein the regular notification is a notification configured to cause a user to check or use the user terminal and is a notification from an actual application, from a plurality of applications, operating on the user terminal; and the dummy notification is a notification in which only a notification sound or vibration is output and is not from any of the plurality of applications operating on the user terminal, wherein the processing circuitry is further configured to detect a state of the user terminal, and execute the dummy notification during a period in which the user terminal is in a state set in advance as a target for performing the dummy notification on the basis of the detected state.

* * * * *